US006875266B1

United States Patent
Naji et al.

(10) Patent No.: US 6,875,266 B1
(45) Date of Patent: Apr. 5, 2005

(54) CONCRETE FORMULATION

(75) Inventors: Basil Taha Naji, Tomgabbie (AU);
Ihor Himezak, Mt Pritchard (AU);
David Malcolm Stitt, Chatswood (AU)

(73) Assignee: James Hardie Research Pty Limited (AU)

( * ) Notice: Subject to any disclaimer, the term of this patent is extended or adjusted under 35 U.S.C. 154(b) by 0 days.

(21) Appl. No.: 09/958,614

(22) PCT Filed: Apr. 10, 2000

(86) PCT No.: PCT/AU00/00301

§ 371 (c)(1),
(2), (4) Date: Jul. 2, 2002

(87) PCT Pub. No.: WO00/61519

PCT Pub. Date: Oct. 19, 2000

(30) Foreign Application Priority Data

Apr. 9, 1999 (AU) .............................................. PP9700

(51) Int. Cl.[7] .............................................. C04B 24/34
(52) U.S. Cl. ........................ 106/724; 106/726; 106/823
(58) Field of Search ................................ 106/724, 725, 106/726, 729, 730, 804, 805, 823

(56) References Cited

U.S. PATENT DOCUMENTS 4,948,429 A * 8/1990 Arfaei

FOREIGN PATENT DOCUMENTS

| CN | 1142473 | 2/1997 |
| DE | 195 40 273 | 10/1995 |
| EP | 0 839 774 | 11/1996 |
| GB | 2 211 183 | 10/1987 |
| WO | WO 98/07667 | 2/1998 |

* cited by examiner

Primary Examiner—Paul Marcantoni
(74) Attorney, Agent, or Firm—Knobbe Martens Olson & Bear LLP

(57) ABSTRACT

An additive for use in the preparation of lightweight concrete, said additive including a blend of from around 40% to 99% of organic polymeric material and from 1% to around 60% of an air entraining agent. The additive is particularly suitable for the preparation of lightweight concrete which uses polystyrene aggregate. It provides for excellent dispersion of the polystyrene aggregate and improved bond between the polystyrene aggregate and surrounding cementitious binder. The resultant lightweight concrete formulation may be pumped and is particularly suitable for sandwich wall construction.

19 Claims, 1 Drawing Sheet

Dynamic response of conventional mix - 1100 kg/m³ density

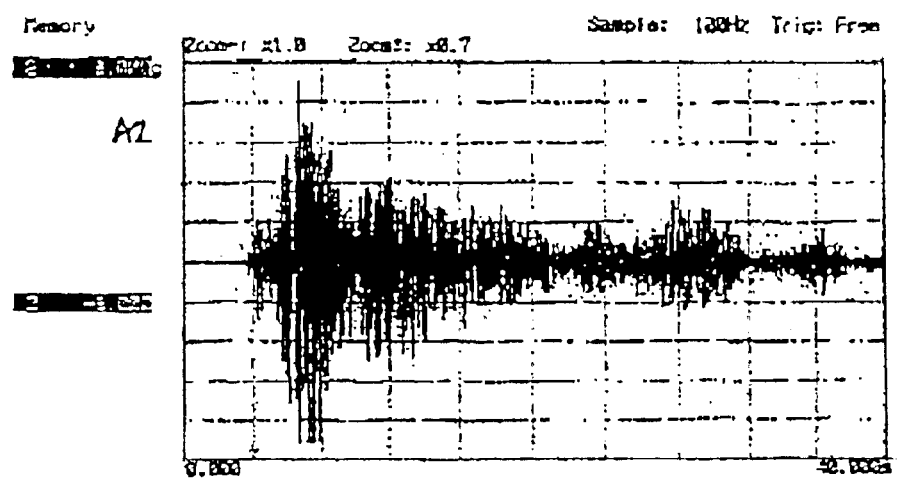
Figure 1 Dynamic response of conventional mix - 1100 kg/m$^3$ density
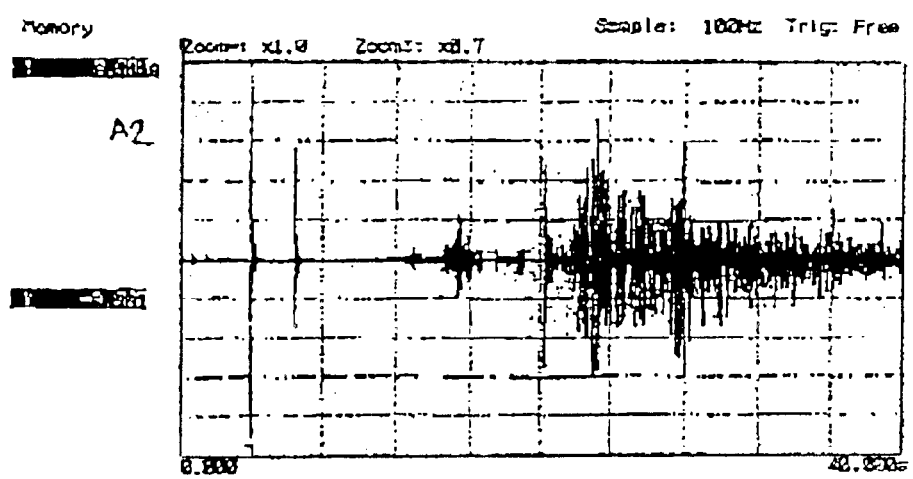
Figure 2 Dynamic response of air-entrained mix - 500 kg/m$^3$ density

CONCRETE FORMULATION

FIELD OF THE INVENTION

The present invention relates to lightweight concretes and particularly but not only to lightweight concretes for use as core infill for sandwich panel walling.

BACKGROUND OF THE INVENTION

The technology involved in producing and pumping lightweight concrete is well known in the prior art. It can generally be achieved using two types of density modifiers, namely foam and lightweight aggregate.

Foamed concrete is made by introducing a water-based, gas-filled foam into a paste that is typically formed with water and Portland cement alone or Portland cement with a fine, lightweight aggregate. The foam structure is developed by adding a gas-generating chemical to the Porland cement paste, or by mixing a pre-formed, water-based foam into the cement paste to achieve a density below 1000 kg/m$^3$.

The latter method requires that Portland cement be mixed with a pre-formed aqueous foam that is produced using a commercial foaming agent, such as a hydrolysed protein. This approach requires a foam generator on site to make the foam.

Correct ratios of foam to concrete, particularly at the job site, are difficult to maintain. This difficulty can lead to the possibility of non-uniformity of the final foamed concrete produced, as well as variable mix quality, pumpability, extrudability, and finishing characteristics. The problems are exacerbated by the fact that the foam begins to collapse from the moment it is formed since the foam is not self-generating.

Lightweight aggregate concrete, made by mixing lightweight aggregate such as expanded polystyrene, perlite and vermiculite together with a mortar is mainly targeted at applications with concrete density above 1000 kg/m$^3$. Difficulties arise, however, in mixing the cementitious slurry and the lightweight aggregate due the tendency of the aggregate to clog and segregate because of its inherent composition and low specific gravity.

To make such polystyrene concrete pumpable, it may be necessary to increase the water content in the mix to overcome friction in the pipes. This tends to aggravate the segregation and clogging problems associated with lightweight aggregate concrete production.

Such lightweight concretes ie. foamed concrete and lightweight aggregate concrete have been used as core infill for sandwich panel walling but are subject to certain difficulties.

Foamed concrete exhibits a high hydrostatic pressure during core filling which sometimes necessitates the use of structural formwork bracing during core-filling of sandwich walls. The mix may also collapse heavily during pumping and pouring from the top of the wall height down into the wall cavity.

As far as lightweight aggregate concrete is concerned, core infill needs to exhibit a density of 1000 kg/m$^3$ or below, which is outside the normal density range for lightweight aggregate concrete. To achieve this, up to 1 m$^3$ of bulk lightweight aggregate volume per 1 m$^3$ of mix is needed to be incorporated in the mix. This leads to difficulties in the coatability of lightweight aggregates due to the insufficient mortar volume present which consequently results in poor mix homogeneity and insufficient bond between the mix constituents.

The inclusion of air-entraining agents (AEAs) to improve freeze/thaw durability, aid pumpability, improve workability, and lower the density of concrete has long been practiced in the art. The AEA dose was normally specified to range between 5% to 9% air volume in the mix, with air content limit set to a maximum of 22% by ASTM C-150. Air contents higher than this were normally avoided, especially in pumped concrete, for a range of reasons including:

during pumping a highly air-entrained concrete, the air bubbles tend to break upon impact with the pipe walls, joints elbows, forms, and the like which leads to variable air contents in the placed concrete;

the pumping stroke can be absorbed by the compressible air enclosed by the pipeline, leading to pumping failure;

the compressibility of excessive air during pumping will reduce its effectiveness as a workable medium and make it more difficult to place;

excessive air in the mix can cause the placed wet concrete to collapse due to the instability of the air-void system; and highly air entrained concrete can lead to excessive reduction in the strength of the hardened product.

It is an object of the present invention to overcome or ameliorate one or more of the disadvantages of the prior art, or at least to provide a commercially useful alternative.

DISCLOSURE OF THE INVENTION

Accordingly, in a first aspect, the invention provides an additive for preparing lightweight concrete, said additive including a blend of around 40 to 99% of organic polymeric material and from 1 to around 60% of an air entraining agent.

In another aspect, the invention comprises a lightweight concrete formulation including one part of cementitious binder, 0.5 to around 1.5 parts by volume of inert filler, 2 to around 6 parts by volume of lightweight aggregate per part by volume of cementitious binder and up to around 2% by weight of the additive.

The additive allows the production of lightweight concrete mix containing preferably up to around 60% entrained air volume. Ideally, the concrete mix contains between 25% and around 50% entrained air volume. This ultra high content is not normally used in concrete mixes due to the difficulty in controlling the mix. Such a high air entrainment level normally also provides difficulties in workability, consistency in density and tendency to collapse, particularly if pumped vertically or at high pressures.

The concrete produced from the abovementioned cement formulation, may range in density up to 1200 kg/m$^3$, however, the improved air stability provided by the blend additive allows the production of a lightweight concrete with a density well below 1000 kg/m$^3$ eg. 450–650 kg/m$^3$ with less lightweight aggregate volume than in conventional mixes of comparable density. By way of comparison, in one embodiment the use of the blend additive has allowed the polystyrene bulk volume in a 1 m$^3$ of mix to be reduced from around 1 m$^3$ to around 0.7 to 0.8 m$^3$. This reduction also results in better coatability of the polystyrene aggregate (i.e. helps ensure that the entire surface of each bead is covered), improved mix workability, and improved bond between the lightweight mortar component and the polystyrene component in the mix.

In one preferred form of the invention the lightweight concrete produced by using the blend additive may be used as core infill in sandwich walling applications without the need for internal or external vibration, or formwork bracing.

It also enables the use of nail-fixing of fibre reinforced cement facing sheet onto the steel framing members without excessive bowing or blow out.

Preferably, the proportion of organic polymeric material in the additive is between 60 and around 90% and more preferably between 70 and around 85%.

Preferably there is between 10 and around 50% of the air-entraining agent in the blend and more preferably between 20 and around 40%.

A broad range of organic polymeric materials may be used in the blend. Preferably the organic polymer will comprise one or more thixotropic agents which either dissolve in water or which at least form colloidal dispersions in the presence of water to produce an increase in viscosity. Suitable organic polymeric materials include cellulose derivatives such as hydroxymethylcellulose, hydroxyethyl cellulose or hydroxy propyl methyl cellulose; polysaccharides such as starches or alginate; and synthetic hydrophilic polymers and copolymers such as polyvinyl alcohol, polyethylene oxide or polypropylene oxide.

Any suitable air entraining agents may be used. The term air entraining agent refers to surface active agents (surfactants) which act to entrain air in the composition as it is mixed with water and/or pumped. Suitable air entraining agents include one or more nonionic, cationic and anionic surfactants such as sodium salts of alpha olefin sulphonates and sodium lauryl sulphate or sulphonate.

The additive may be mixed with a broad range of cementitious binders which include all inorganic materials comprising compounds of calcium, aluminium, silicon, oxygen and/or sulphur which exhibit hydraulic activity ie. set solid and hard in the presence of water. Well known cements of this type include common Portland cements, fast setting or extra fast setting, sulphate resisting cements, modified cements, alumina cements, high alumina cements, calcium aluminate cements and cements which contain secondary components such as fly ash, pozzolana and the like. The term "cementitious binder" includes other well known binders such as fly ash, slag etc. and mixtures thereof with Portland cement.

Suitable lightweight aggregates are also well known in the art. They include a range of natural and synthetic lightweight aggregates such as perlite, vermiculite and expanded polystyrene. The expanded polystyrene may be in the form of balls, beads, pellets or reclaimed particles.

The lightweight concrete may also include between 50 and 100% by weight of the cementitious binder of an inert densifying ingredient in particulate form or an inert particulate material. The term "inert particulate material" indicates a material being inert with regard to other components of the composition, having a density greater than the lightweight aggregate and less than 5 mm in size. The preferred inert particulate material is natural masonry sand.

In a further aspect, the present invention provides a method of constructing a wall comprising the steps of providing a frame having a plurality of substantially parallel mutually spaced apart frame members, attaching facing sheets to said frame and filling the cavity formed between said facing sheets with a lightweight concrete, the lightweight concrete comprising a cementitious binder, a lightweight aggregate and up to 2% of an additive comprising a blend of 40–99% of organic polymeric material or combination thereof and 1–60% of air entraining agents.

In still a further aspect, the present invention provides a method for forming a pumpable lightweight concrete mix comprising the stops of firstly mixing the additive with water to form an aqueous solution, secondly adding expanded polystyrene aggregate to the aqueous solution and thereafter adding cementitious binder.

Further unexpected benefits arise particularly when polystyrene is used as a lightweight aggregate filler material. There is a known problem with polystyrene in this context, in that the individual particles tend to develop electrostatic surface charges. This causes the aggregates to clump together and float to the top of the mix in situ, giving rise to uneven distribution, compromised structural integrity, and largely negating the intended effect. In order to overcome this problem, it is usually necessary to pretreat the polystyrene aggregates in order to neutralise them. This requires additional chemicals, a separate process step, and often a subsequent drying process as well. However, the applicant has found that by use of the above defined additive, this problem of clumping can be avoided. In this regard, the additive is initially mixed with water to form an aqueous solution, and the polystyrene is then added to this solution. Unexpectedly, this has been found to neutralise the surface charge on the polystyrene, without any additional chemicals or process steps being required. The solid components are then added to the mix as a final step. By obviating the need for a separate pretreatment process for the polystyrene aggregates, substantial material cost savings and production efficiencies can be realised.

Another advantage arising from the present invention when used in conjunction with polystyrene lightweight aggregate is the bond strength between the polystyrene and concrete. For reasons that are not entirely understood, the polystyrene does not normally bond well with a cementitious binder. It is suspected that this may be due to the hydrophobic nature of the polystyrene aggregate. Not wishing to be bound by any particular theory, the applicant has found that use of the additive defined above also increases the bond strength between the polystyrene aggregate and the surrounding cementitious binder. This may be due to the polystyrene aggregate being rendered hydrophilic or other mechanisms which cannot at this time be fully analysed. In any event, as will be discussed below there is a substantial improvement in the bond strength between the polystyrene lightweight aggregate and surrounding cementitious material.

Unless the context clearly requires otherwise, throughout the description and the claim, the words 'comprise', 'comprising', and the like are to be construed in an inclusive as opposed to an exclusive or exhaustive sense; that is to say, in the sense of "including, but not limited to".

BRIEF DESCRIPTION OF THE DRAWINGS

FIG. 1 is a graphic illustration of the dynamic response of conventional mix-1100 kg/m$^3$ density; and FIG. 2 is a graphic illustration of the dynamic response of air-entrained mix-500 kg/m$^3$ density.

BEST MODE FOR CARRYING OUT THE INVENTION

So that the present invention may be more clearly understood it will now be described with reference to the following examples.

Example 1–3 describes various mixtures of lightweight concrete using polystyrene aggregate, perlite and vermiculite as lightweight aggregate and sand and fly ash as fillers.

EXAMPLE 1
Use of EPS As Lightweight Aggregate and Sand As Filler

|  | Quantity | Unit |
| --- | --- | --- |
| Mix Ingredients |  |  |
| Cement | 50 | kg |
| Sand | 40 | kg |
| Polystyrene Aggregate (50% solid/bulk ratio) | 200 | liters |
| Water | 35 | liters |
| Blend: |  |  |
| Air Entrainer (Anionic Surfactant) | 0.1% | by wt. of cement |
| Organic polymer | 0.3% | by wt. of cement |
| Density of fresh mix | 500 | kg/m$^3$ |
| Yield of fresh mix | 250 | liters |
| % Entrained Air | 30% |  |

EXAMPLE 2
Use of Polystyrene As Lightweight Aggregate and Fly Ash+Sand As Filler

|  | Quantity | Unit |
| --- | --- | --- |
| Mix Ingredients |  |  |
| Cement | 30 | kg |
| Sand | 20 | kg |
| Fly Ash | 45 | kg |
| Polystyrene Aggregate (50% solid/bulk ratio) | 225 | liters |
| Water | 45 | liters |
| Blend: |  |  |
| Air Entrainer (Anionic Surfactant) | 0.1% | by wt. of cement |
| Organic polymer | 0.3% | by wt. of cement |
| Density of fresh mix | 500 | kg/m$^3$ |
| Yield of fresh mix | 280 | liters |
| % Entrained Air | 30% |  |

EXAMPLE 3
Use of Perlite As Lightweight Aggregate

|  | Quantity | Unit |
| --- | --- | --- |
| Mix Ingredients |  |  |
| Cement | 40 | kg |
| Sand | 40 | kg |
| Perlite (50% solid/bulk ratio) | 40 | liters |
| Water | 30 | liters |
| Blend |  |  |
| Air Entrainer (Anionic Surfactant) | 0.3% | by weight of cement |
| Organic polymer | 0.3% | by weight of cement |
| Density of fresh mix | 700 | kg/m$^3$ |
| Yield of fresh mix | 160 | liters |
| % Entrained Air | 50% |  |

Comments on Examples 1–3

The mixes prepared according to those recipes were pumped into the cavities of a number of fibre reinforced cement lined sandwich walls, 2400 mm×2400 mm×75 mm in size. Upon observation, it was found that the mixes were:

Pumpable, i.e. no clogging of line or segregation of mix was observed.

Stable, i.e. the air-entrained mix sustained its level in the wall cavity and did not collapse.

The YIELD of the fresh mix means the volume of the mix produced in one batch. It is important that this yield is maintained after pumping and placing of the concrete, which indicates the stability of the mix.

The density of the FRESH mix means the density of the concrete before setting, which is the one most critical to the application of wall core filling.

Examples 1 and 2

Air Entrainer sodium lauryl sulphate
Organic Polymer hydroxypropyl methylcellulose

EXAMPLE 3

Air Entrainer Myristamine Oxide
Organic Polymer hydroxypropyl methylcellulose

The applicant has found that when the blend additive is used to produce a lightweight aggregate concrete, the resultant mix has similar pumpability performance to that of a conventional lightweight aggregate mix.

Example 4 below compares the pumpability performance of two lightweight concrete mixes, one with air entrainment and one without, containing a similar volume of polystyrene aggregate. Sixteen batches of each mix were produced, pumped to the 8$^{th}$ floor and used for core-filling of sandwich walls lined with FRC facing. The two mixes were run back-to-back to minimise site, equipment and human interference with the core filling rates produced. It can be seen that the core filling rates corresponding to each mix taken as core-filled area (m$^2$) divided by pumping time (hrs), were comparable.

EXAMPLE 4
Pumpability Performance of Lightweight Aggregate (polystyrene) Concrete with and without Air-entrainment

|  | Non Air-entrained Conventional Mix | Air-entrained Mix |
| --- | --- | --- |
| Mix Ingredients |  |  |
| MIX DESIGN |  |  |
| Cement | 50 kg | 50 kg |
| Sand | 90 kg | 45 kg |
| Polystyrene Aggregate | 150 liters | 200 liters |
| Water | 37 liters | 35 liters |
| Blend |  |  |
| Air Entrainer (Anionic Surfactant) | nil | 0.1% by wt. of cement |
| Organic polymer (Cellulose ether) | nil | 0.3% by wt. of cement |
| % Entrained Air (calculated from yield and density measurements) | 2% | 25% |
| % Polystyrene aggregate (calculated from yield and density measurements) | 47% | 47% |
| AT MIXING STATION |  |  |

-continued

|  | Non Air-entrained Conventional Mix | Air-entrained Mix |
|---|---|---|
| Density of fresh mix | 1075 kg/m$^3$ | 525 kg/m$^3$ |
| Yield of fresh mix | 170 liters | 240 liters |
| Mixing/pumping time (16 batches) ON THE 8$^{TH}$ FLOOR | 100 minutes | 75 minutes |
| Density of fresh mix | 1100 kg/m$^3$ | 575 kg/m$^3$ |
| Loss in yield | 2% | 9% |
| Wall core-filling rate | 28.8 m$^2$/hr | 26.4 m$^2$/hr |

Clearly better mix pumpability resulted from inclusion of the blend additive in the mix which led to reduced friction in the pipes. Also, less clogging of the pipes will be experienced due to improved mix homogeneity, better coatability of beads and its segregation-free characteristic.

The applicants have found that the lightweight aggregate concrete resulting from use of the blend additive provides not only substantially lower density but enables reduced hydrostatic pressure and dynamic thrust during core filling.

EXAMPLE 5
Extent of Bowing Comparison in Core-filled Walls

The two mixes shown in example 4 were pumped into a 400 mm wide, 2.4 m high wall cavity and the central deflection (bowing) on the 6 mm fibre reinforced cement (FRC) facing sheet during the core filling was measured using Linear Voltage Displacement Transducers (LVDTs). They are shown in the table below:

| Lightweight Concrete Mix | Deflection at 300 mm from wall base | Deflection at 600 mm from wall base |
|---|---|---|
| Conventional 1000 kg/m$^3$ mix | 4.00 mm | 3.8 mm |
| Air-entrained 500 kg/m$^3$ mix | 1.7 mm | 1.6 mm |

From the deflection measurements outlined above it can be seen that the air-entrained 500 kg/m$^3$ density mix enables around a 50% reduction in the bowing of FRC facing when used as core infill in lieu of the conventional 1000 kg/m$^3$ density mix.

EXAMPLE 6
Dynamic Thrust Comparison in Core-filled Walls

The two mixes shown in example 4 were pumped into a 400 mm wide, 2.4 m high wall cavity, and the dynamic response (thrust) during core filling was measured using an accelerometer mounted near the wall base. The results are shown in FIGS. 1 and 2. It can be seen that the lightweight concrete (air-entrained) mix exhibited significantly less dynamic thrust compared with the conventional polystyrene aggregate nor-air-entrained mix.

The reduced hydrostatic pressure exemplified in example 6 has significant advantages over the prior art. It enables elimination of the need for external formwork bracing to control bowing and blow-out of the wall panel. It also enables quicker construction since a nail gun may be used to fix the fibre reinforced cement facing sheets to the frame rather than screw fixing. Reduced hydrostatic pressure and dynamic thrust during core filling also enables the use of lighter gauge steel framing due to less stiffness/torsional requirements.

A number of other surprising and unexpected benefits have been found to flow from the present invention including improved homogeneity of the resultant lightweight aggregate concrete. The lightweight mix is free flowing, self levelling, segregation free and can be used to fill, for example, the cavity in a sandwich wall without the need to consolidate the mix by internal vibration or external tapping.

EXAMPLE 7
Moisture Retention Comparison

The two mixes shown in example 4 were poured into 2400 mm×1200 mm×75 mm walls constructed using studs of the same gauge at the same pitch and allowed to cure at ambient conditions for two weeks. The walls were then transferred to a drying cell where they were subjected to 20 cycles of 360 minute duration with half the time at ambient temperature and the other half at 45° C. This was followed with a further 10 cycles of 60 minutes of heating at 70° C. and 10 minutes at ambient temperature. After the drying exposure, core samples were taken and the moisture content of each wall was determined at a similar location in each wall.

The results of the moisture analysis revealed that the lightweight concrete (air-entrained) mix retained 9.38% moisture compared to 5.13% moisture in the conventional polystyrene aggregate non-air entrained mix. This indicates that, even after severe prolonged drying, the lightweight mix according to this invention exhibits water retention capability up to almost double the moisture retained in the conventional mix.

From the above, it can be seen that the lightweight concrete mix exhibits superior water retention capability compared with conventional lightweight (polystyrene) concrete. This limits the volume of water liberated by the mix within the wall cavity, resulting in reduced wetting of the fibre reinforced cement facing sheets. Consequently, the facing sheets suffer less degradation in their structural properties. In particular, their stiffness and screw holding capacity are maintained, leading to less bowing and blow-out during core filling. Also, drier sheets lead to lessened and more progressive shrinkage of the sheet as the wall dries. This causes less strain (less opening) at the jointed gaps between the sheets.

Another outcome of the effect of improved water retention of the core mix is the reduced joint degradation due to the reduced volume of excess free water coming from the mix and diffusing through the joints. This enables better adhesion of the base compound and less damage to and distortion of paper jointing tape extending between adjacent facing sheets. Also, drier joints enable quicker and earlier jointing of walls on site and reduced degradation from any alkali dissolved in the cement water permeating into the jointing zone.

EXAMPLE 8
Bond Strength Comparison

The walls subjected to drying in example 7 were tested for bond strength between the fibre reinforced cement facing sheets and the two mixes outlined in example 4. This was achieved by applying a tensile force to the FRC/core interface at different wall levels along its height. The results are shown in the table below:

| Test location | Bond Stress (MPa) | | | |
|---|---|---|---|---|
| along wall height | Conventional 1100 kg/m³ mix | Failure Mode | Air-entrained 500 kg/m³ mix | Failure Mode |
| 300 mm | 0.12 | Adhesive | 0.14 | Cohesive |
| 900 mm | 0.07 | Adhesive | 0.11 | Cohesive |
| 1800 mm | 0.08 | Adhesive | 0.08 | Cohesive |
| 2100 mm | 0.00 | Adhesive | 0.06 | Cohesive |

It can be seen that, upon cyclic drying, the air-entrained mix exhibited less degradation in bond strength compared with the conventional lightweight mix. It can also be noted that the two mixes exhibited distinctly different failure modes. The conventional mix failed in an "adhesive" manner, i.e. by separation of the FRC component from the core along their interface. The air-entrained mix, on the other band, failed in a "cohesive" manner, i.e. the FPC/core interface remained bonded and the failure occurred in the core.

From the above, it can be seen that the lightweight mix according to the present invention exhibits superior adhesion to the fibre reinforced facing sheets. That is to say, the composite strength of sheet/concrete/sheet is improved which leads to improvement in the overall performance characteristics of the sandwich wall. This is quite surprising since there was nothing to suspect that the additive or process for producing the lightweight concrete formulation would exhibit such superior adhesion. It will be clear to persons skilled in the art that such "cohesive" failure is a substantial improvement over and above conventional techniques.

EXAMPLE 9
Anchor Pull Out Comparison

The walls subjected to drying in example 7 were tested for their anchor pull out load capacities. Anchor holes were drilled and two types of anchors were inserted in both walls and tested by applying an axial load to the bolt head until a peak load was reached defining anchor yielding. The results are shown in the table below:

| | Pull out Load (KN) | |
|---|---|---|
| Anchor Type | Conventional 1100 kg/m³ mix | Air-entrained 500 kg/m³ mix |
| HILTI HGN 12 (Ø10 mm Bolt size) | 2.11 | 0.71 |
| HILTI HHD 6/19 (Ø6 mm Bolt size) | 0.90 | 1.30 |

It can be seen that when an anchor intended for conventional lightweight concrete was used, i.e. the HILTI HGN 12, the air-entrained mix exhibited 65% lower pull out load compared with the conventional mix. Since this anchor relies on core density to achieve its pull out load characteristic, the fact that the lightweight concrete is 55% lower in density translates into reduced tensile strength and consequently reduced pull out strength.

On the other hand, when a cavity wall anchor HILTI HHD 6/19 was used, the table shows that the pull out force trend relating to the two mixes was reversed, i.e. the air-entrained mix exhibited 44% higher pull out load compared with conventional mix. This result is believed to be related to the improved bond strength of the air-entrained mix which helps transfer the pull out forces directly to the facing sheet, due to the presetting action required by the anchor prior to its being loaded. When the HHD type anchor is set, the body is collapsed into four radially oriented arms that come into contact with the facing skin. In short, the carrying capacity/density ratio of the core mix is substantially improved.

This result is quite surprising. Not only does the lightweight concrete provide good insulation due to high entrained air volume, but at the same time it meets acceptable hanging capacity requirements needed for hanging basins, cupboards, and the like.

EXAMPLE 10

Density Modification

Typical formulations for lightweight concrete with densities of 1200 kg/m³ and 450 kg/m³ are shown. Both examples showed excellent dispersion and bond strength with the polystyrene aggregate.

| Mix Density | Liters | Kg | 1200 Ratio by vol. | 1200 Ratio by wt. |
|---|---|---|---|---|
| Binder | 253 | 354 | 100.00% | 100.00% |
| Inert Filler | 394 | 630 | 155.56% | 177.78% |
| Poly Aggregate | 295 | 3 | 116.67% | 0.83% |
| Water | 211 | 211 | 83.46% | 59.61% |
| Additive | 7 | 2 | 2.72% | 0.68% |

| Mix Density | Liters | Kg | 450 Ratio by vol. | 450 Ratio by wt. |
|---|---|---|---|---|
| Binder | 108 | 151 | 100.00% | 100.00% |
| Inert Filler | 95 | 151 | 87.50% | 100.00% |
| Poly Aggregate | 946 | 9 | 875.00% | 6.25% |
| Water | 140 | 140 | 129.85% | 92.75% |
| Additive | 6 | 2 | 5.25% | 1.31% |

In all these respects, the invention represents a practical and commercially significant improvement over the prior art.

Although the invention has been described with reference to specific examples it will be appreciated to those skilled in the art the invention may be embodied in many other forms.

What is claimed is:

1. A lightweight concrete formulation including about 8%–22% by volume of cementitious binder, about 7%–34% by volume of inert filler, about 25%–73% by volume of lightweight aggregate, said lightweight aggregate including a polystyrene lightweight aggregate treated by a treatment agent comprising a blend of about 40%–99% organic polymeric material and about 1%–60% air entraining agent.

2. A lightweight concrete formulation according to claim 1, wherein the cementitious binder includes one or more compounds of calcium, aluminum, silicon, oxygen or sulphur, or compositions of Portland cement, sulphate resisting cement, modified cement, alumina cement, high alumina cement, calcium aluminate cement or cements containing secondary components including fly ash, or slag.

3. A lightweight concrete formulation according to claim 1, wherein the lightweight aggregates include perlite or vermiculite.

4. A lightweight concrete formulation according to claim 1, wherein between around 50% and 100% by weight of the cementitious binder includes an inert particulate material.

5. A lightweight concrete formulation according to claim 4, wherein the inert particulate material is natural masonry sand.

6. A lightweight concrete formulation according to claim 2, wherein the cementitious binder is a blended cement comprising about 10–90% by volume of Portland cement and about 90–10% by volume of a mineral additive selected from the group consisting of fly ash, slag, metakaolin, and silica fume.

7. A concrete mix including a lightweight concrete formulation according to claim 1, and containing up to around 60% of entrained air volume.

8. A concrete mix according to claim 7 and containing between about 25% and 50% of entrained air volume.

9. A concrete mix according to claim 7, having an overall density of between around 1200 kg/m$^3$ and 450 kg/m$^3$.

10. A concrete mix according to claim 9, having an overall density of between about 450 kg/m$^3$ and 650 kg/m$^3$.

11. A method of constructing a wall comprising the steps of erecting a frame having a plurality of substantially parallel mutually spaced apart frame members, attaching facing sheets to said frame, and filling a cavity formed between said facing sheets with the lightweight concrete mix according to claim 7.

12. A method of forming a pumpable lightweight concrete mix comprising the steps of firstly mixing the treatment agent according to claim 1 with water to form an aqueous solution, secondly adding expanded polystyrene aggregate to the aqueous solution, and thereafter adding a cementitious binder.

13. A method according to claim 12, wherein the mix comprises:

about 8%–22% by volume of cementitious binder;

about 11%–18% by volume nominal water;

about 7%–34% by volume inert filler;

about 25%–73% by volume lightweight aggregate; and up to around 5% by volume of additive.

14. An additive for preparing a lightweight concrete mix containing a lightweight aggregate and a cementitious binder, said additive comprising about 40%–99% organic polymeric material and about 1%–60% air entraining agent, wherein said additive increases the entrained air volume of the mix to up to about 60% volume without substantially reducing the consistency and workability of the mix as compared to an equivalent mix without said additive.

15. The additive of claim 14, wherein said organic polymeric material comprises a thixotropic agent.

16. The additive of claim 14, wherein said organic polymeric material comprises a cellulose derivative.

17. The additive of claim 14, wherein said organic polymeric material is selected from the group consisting of hydroxymethylcellulose, hydroxyethyl cellulose, hydroxy propyl methyl cellulose, polysaccharides, synthetic hydrophilic polymers, polyvinyl alcohol, polyethlene oxide, and polyproylene oxide.

18. The additive of claim 14, wherein the lightweight aggregate comprises polystyrene.

19. The additive of claim 18, wherein said additive increases the bond strength between the polystyrene and the cementitious binder.

* * * * *

UNITED STATES PATENT AND TRADEMARK OFFICE
CERTIFICATE OF CORRECTION

PATENT NO. : 6,875,266 B1
DATED : April 5, 2005
INVENTOR(S) : Basil Taha Naji et al.

It is certified that error appears in the above-identified patent and that said Letters Patent is hereby corrected as shown below:

Column 1,
Line 19, delete "Porland" and insert -- Portland --.

Column 2,
Line 64, after "invention" add -- , --.
Line 67, delete "stops" and insert -- steps --.

Column 4,
Line 46, delete "claim" and insert -- claims --.

Column 7,
Line 55, delete "nor-air-entrained" and insert -- non-air-entrained --.

Column 9,
Line 20, delete "FPC/core" and insert -- FRC/core --.

Column 10,
Line 41, after "art" add -- that --.

Column 12,
Line 22, delete "polyethlene" and insert -- polyethylene --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,875,266 B1
APPLICATION NO. : 09/958614
DATED : April 5, 2005
INVENTOR(S) : Basil Taha Naji et al.

It is certified that error appears in the above-identified patent and that said Letters Patent is hereby corrected as shown below:

Cover Page, Item (75)

delete "Tomgabbie" and insert --Toongabbie-- delete "Himezak" and insert --Hinzak--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,875,266 B1  Page 1 of 1
APPLICATION NO. : 09/958614
DATED : April 5, 2005
INVENTOR(S) : Basil Taha Naji et al.

It is certified that error appears in the above-identified patent and that said Letters Patent is hereby corrected as shown below:

Cover Page, Item (75)

delete "Tomgabbie" and insert --Toongabbie-- delete "Himezak" and insert --Hinczak--

This certificate supersedes Certificate of Correction issued November 21, 2006.

Signed and Sealed this

Tenth Day of July, 2007

JON W. DUDAS
*Director of the United States Patent and Trademark Office*